United States Patent [19]
Wilson

[11] 3,747,095
[45] July 17, 1973

[54] SYNCHRONOUS SATELLITE TRACKING SYSTEM
[75] Inventor: Robert Woodrow Wilson, Holmdel, N.J.
[73] Assignee: Bell Telephone Laboratories Incorporated, Murray Hill, N.J.
[22] Filed: Oct. 19, 1970
[21] Appl. No.: 81,792

[52] U.S. Cl......... 343/7.4, 235/150.26, 343/100 ST
[51] Int. Cl............................................. G01s 9/02
[58] Field of Search.................... 235/150.2, 150.26, 235/150.27; 343/7 A, 7.4, 100 ST

[56] References Cited
UNITED STATES PATENTS
| | | | |
|---|---|---|---|
| 3,206,559 | 9/1965 | Barney | 343/100 ST X |
| 3,316,552 | 4/1967 | Reid | 343/7.4 X |
| 3,148,369 | 9/1964 | Zable et al. | 343/7.4 X |
| 3,218,640 | 11/1965 | Kindle et al. | 343/7 A |

Primary Examiner—Malcolm F. Hubler
Attorney—R. J. Guenther and E. W. Adams, Jr.

[57] ABSTRACT

A synchronous earth satellite typically describes a figure "8" pattern because the plane of its orbit is generally inclined and/or elliptical. To satisfactorily track this satellite motion, the Fourier components of the same in azimuth and elevation are calculated from the orbit parameters and a partial Fourier series synthesizer is utilized to derive a pair of voltages proportional to desired elevation and azimuth correction signals. The latter are then used to correct the original or normal positioning of the tracking antenna so that the same follows the figure "8" pattern described by the satellite.

9 Claims, 3 Drawing Figures

INVENTOR
R. W. WILSON
BY John K. Mullavney
ATTORNEY

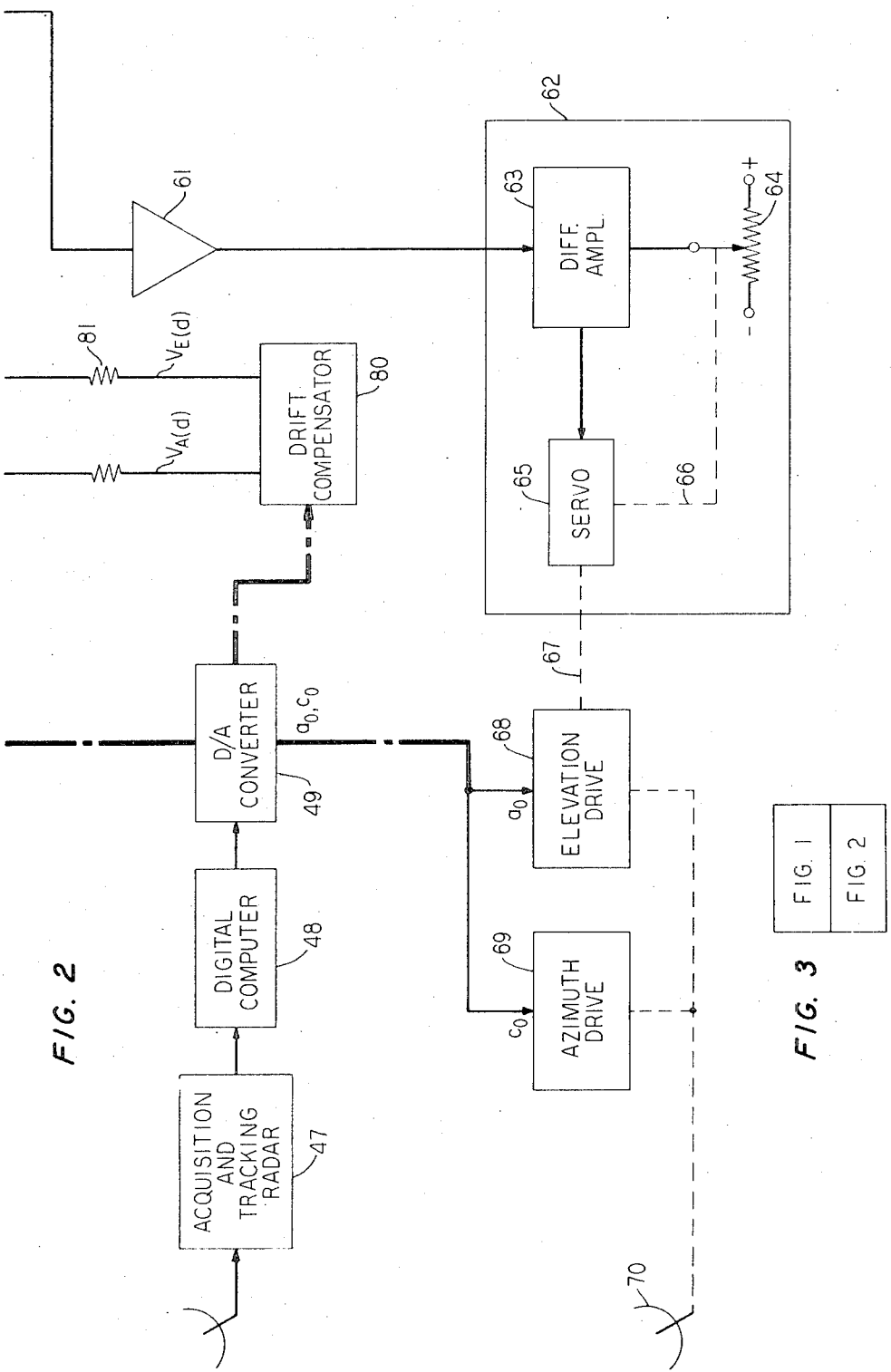

SYNCHRONOUS SATELLITE TRACKING SYSTEM

BACKGROUND OF THE INVENTION

This invention relates to synchronous earth satellite communication systems and, more particularly, to a synchronoue earth satellite antenna tracking system.

Recent developments in the earth satellite field have included the deployment in space of so-called synchronous satellites. These satellites move in an orbit of such a radius that their angular velocity is exactly the same as the angular velocity of the earth. Thus, the satellites maintain a nominally fixed position relative to the earth. Typically, a synchronous satellite is positioned over a fixed point on the equator, thus being visible to signals emanating from both the northern and sourthern hemispheres.

The advantages of such an arrangement are manifold in the field of satellite communications. For example, with a synchronous satellite it is possible for two widely separated points on each to be in constant communication with each other despite extensive atmospheric or other disturbances along the intervening terrestrial path. And, with the use of directional tracking antenna system more efficient use can be made of satellite transmitted power, resulting in higher received signal levels at the message destination.

Now a synchronous earth satellite will appear to be in a stationary position in the frame of a ground observer if its orbit it exactly circular and in the plane of the earth's equator. However, the apparent position will vary cyclically if the plane of the orbit is inclined or if the orbit is elliptical. The satellite motion generally takes the form of a figure "8". This figure "8" motion has been widely observed and extensively described in the literature; see, for example, the article "Efficient Spacing of Synchronous Communication Satellites" by H. E. Rowe and A. A. Penzias, *The Bell System Technical Journal*, December 1968, Vol. 47, No. 10, pages 2379–2433. To track such a satellite the elevation and azimuth pointing of a ground antenna must also be varied in corresponding cyclical fashion.

SUMMARY OF THE INVENTION

It is, therefore, the primary object of the present invention to provide a simplified system for automatically tracking an earth satellite whose motion takes the form of a cyclical figure "8".

In accordance with the invention, it has been found that for orbits of inclination < 12° and of limited elipiticity (i.e., < 0.01), an advantageous way of generating the requisite tracking coordinates is to constitute the elevation and azimuth motion from the first few terms of their Fourier series representation. To this end, the Fourier components of the satellite's motion in azimuth and elevation are calculated from the orbit parameters and a discrete or partial Fourier series synthesizer is used to derive a pair of voltages proportional to the desired azimuth and elevation correction signals. The latter are then utilized in an additive fashion to correct the original or normal positioning of the tracking antenna so that the same follows the figure "8" pattern described by the satellite. More specifically, for the orbits of limited inclination and ellipticity noted above, only the first three terms of the Fourier series representation need be synthesized to achieve satisfactory tracking of the satellite. And, the state of the rocketry art is such that a satellite can readily be placed in such a limited synchronous orbit.

It is a feature of the invention, however, that for orbits of inclination and/or ellipticity greater than the aforementioned, the requisite tracking coordinates can be derived through the synthesis of additional terms of the Fourier series representation of the satellite's motion.

BRIEF DESCRIPTION OF THE DRAWINGS

The invention will be more fully appreciated from the following detailed description when considered in connection with the accompanying drawings in which:

FIGS. 1 and 2, when arranged as shown in FIG. 3, show a detailed schematic drawing of a preferred embodiment of the present invention.

DETAILED DESCRIPTION

Figure 1:
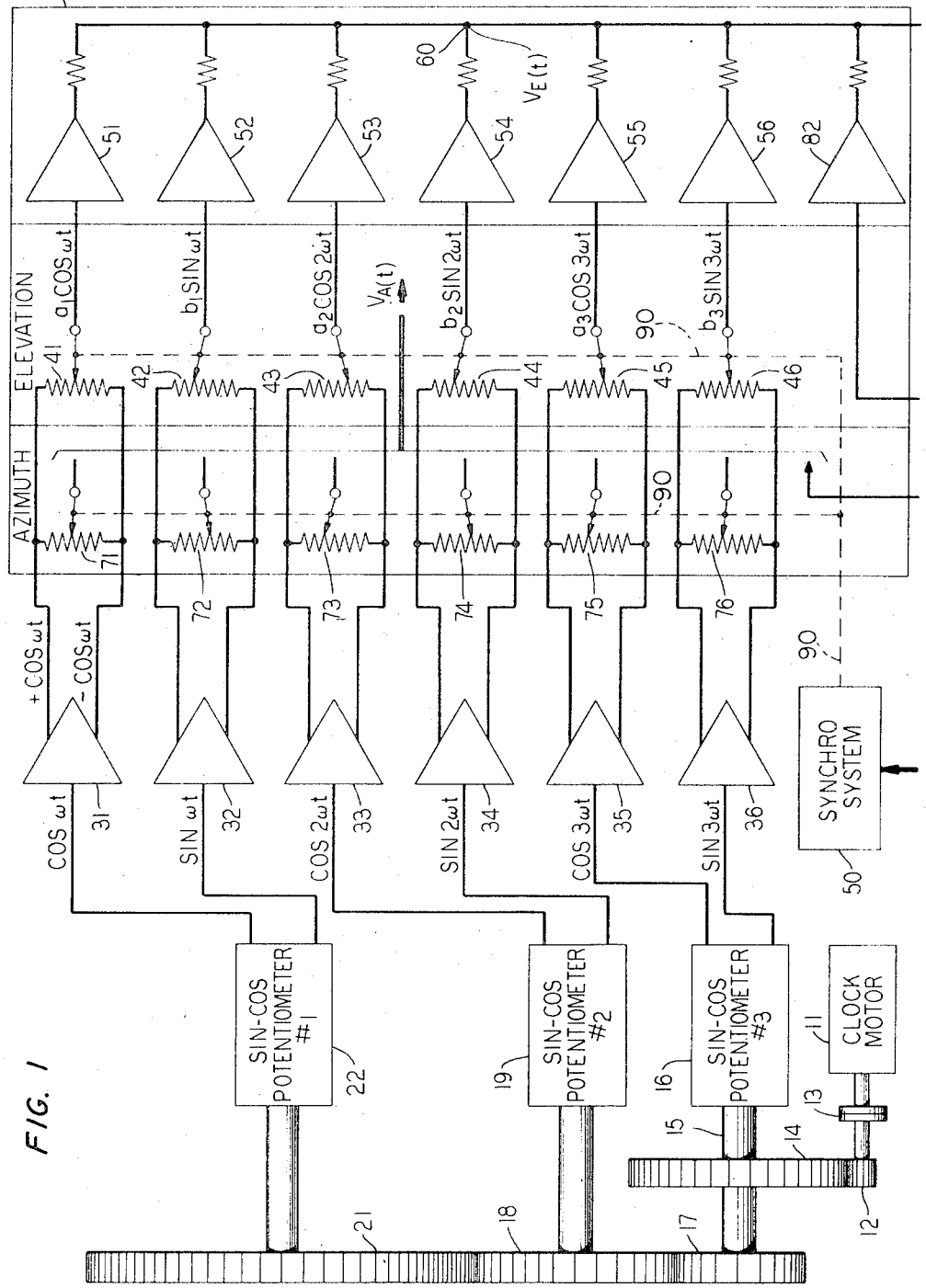

As is well known, by anyone acquainted with integral calculus, any periodic function can be represented by a Fourier series:

$$f(x) = \frac{1}{2} b_0 + \sum_{n=1}^{\infty} a_n \sin nx + \sum_{n=1}^{\infty} b_n \cos nx \quad (1)$$

where the coefficients were given by $$a_n = \frac{1}{\pi} \int_{-\pi}^{\pi} f(\xi) \sin n\xi \, d\xi;$$

$$b_n = \frac{1}{\pi} \int_{-\pi}^{\pi} f(\xi) \cos n\xi \, d\xi. \quad (2)$$

The expression $\frac{1}{2}b_0$ represents the average value of the variable being considered; in the instant case this is the average or normal value of the elevation or azimuth of the earth satellite. The above equations represent the generalized Fourier series equations for all periodic, continuous functions; see *The International Dictionary of Physics and Electronics*, D. Van Nostrand Co., Inc. (1956), pages 358–359.

In the instant case, similar type Fourier series equations can be written for the periodic continuous functions of elevation (E) and azimuth (A). If we represent the continuous functions E(t) and A(t) by their Fourier series representations:

$$E(t) = a_0 + \sum_{n=1}^{\infty} (a_n \cos(n\omega t) + b_n \sin(n\omega t))$$

$$A(t) = c_0 + \sum_{n=1}^{\infty} (c_n \cos(n\omega t) + d_n \sin(n\omega t)) \quad (3)$$

Then the coefficients $a_n$, $b_n$, $c_n$, $d_n$ can be calculated from the formulae:

$$a_n = \frac{1}{12}\int_0^{24} E(t) \cos (n\omega t) dt$$

$$b_n = \frac{1}{12}\int_0^{24} E(t) \sin (n\omega t) dt$$

$$c_n = \frac{1}{12}\int_0^{24} A(t) \cos (n\omega t) dt$$

$$d_n = \frac{1}{12}\int_0^{24} A(t) \sin (n\omega t) dt$$

$$a_0 = \frac{1}{24}\int_0^{24} E(t) dt$$

$$c_0 = \frac{1}{24}\int_0^{24} A(t) dt \tag{4}$$

where $\omega = 2\pi/24$ and $t$ = time in sidereal hours. The values $a_o$ and $c_o$ are the equivalent of $\frac{1}{2}b_o$ of equation (1) and they represent the average or normal values of the elevation and azimuth, respectively.

Now it has been found by applicant that the Fourier series can be truncated after $m$ terms with little sacrifice in tracking reliability. Specifically, for orbits of limited inclination ($< 12°$) and limited ellipticity ($< 0.01$) only the first three terms of the Fourier series representation need be summed or synthesized to achieve satisfactory tracking (error $< 0.01°$) of the satellite. Thus the Fourier series equations (3) reduce to:

$$E(t) = a_0 + \sum_{n=1}^{3} (a_n \cos (n\omega t) + b_n \sin (n\omega t))$$

$$A(t) = c_0 + \sum_{n=1}^{3} (c_n \cos (n\omega t) + d_n \sin (n\omega t)) \tag{5}$$

where $n = 1, 2, 3$.

Turning now to the drawings, which show a preferred embodiment of the present invention, the clock motor 11 turns at a rate of one revolution per sidereal hour. This rotation is transmitted to the gear 12 via the slip clutch 13, which will be further described hereinafter. The gear 12 is meshed with gear 14 and the gear ratio between these two gears is 8:1. Thus, for every full revolution of gear 12, gear 14 completes one-eighth of a revolution. This rotation of gear 14 is transmitted via shaft 15 to the wiper arms of a sin-cosine potentiometer 16 and to the gear 17. Sin-cosine potentiometers are well known in the art and are commercially available. Since the shaft 15 makes one revolution per eight hours, the output signals from potentiometer 16 comprise two signals, namely, $\sin 2\pi t \cdot \frac{1}{8}$ and $\cos 2\pi t \cdot \frac{1}{8}$. And since $2\pi/24 = \omega$ these signals can be rewritten as $\sin 3\omega t$ can $\cos 3\omega t$, by simple substitution.

The gear 17 meshes with gear 18 and the gear ratio of these gears is $\frac{1}{2} : 1/3$. Thus, for every one-half revolution of gear 17, gear 18 completes one-third of a revolution. The rotation of gear 18 is transmitted to the wiper arms of the sin-cosine potentiometer 19. The gear 18 thus completes one revolution every twelve hours and, therefore, the output signals from potentiometer 19 comprise two signals, namely, $\sin 2\pi t/12$ and $\cos 2\pi t/12$. The latter signals can similarly be rewritten as $\sin 2\omega t$ and $\cos 2\omega t$.

The gear 18 meshes with gear 21 and the gear ratio therebetween is 2:1. For every full revolution of gear 18, the gear 21 completes one half a revolution which is transmitted to the wiper arms of yet another sin-cosine potentiometer 22. The gear 21 thus completes one revolution every 24 hours and the output signals from the potentiometer 22 are $\sin 2\pi t/24$ and $\cos 2\pi t/24$, or $\sin \omega t$ and $\cos \omega t$.

It is these first three sin-cosine terms (or harmonics) that are summed or synthesized together with the computed coefficients $a_n, b_n, c_n, d_n$ so as to arrive at the requisite elevation and azimuth correction signals, in the manner to be described.

To insure correlation of operation of the instant apparatus with the satellite's motion, the clutch 13 is disengaged and the sin-cosine potentiometers 16, 19, and 22 are set to their nominal zero angle; i.e., the sin outputs are all zero ($\sin \omega t = \sin 2\omega t = \sin 3\omega t = 0$) and the cos outputs are all one ($\cos \omega t = \cos 2\omega t = \cos 3\omega t = +1$). The clutch is then engaged at that time at which the satellite crosses the equator going north. This time is readily computed from the orbit parameters derived from the satellite's motion. This computation is typically carried out by the computer to be described hereinafter. The time of equator crossing corresponds essentially to the crossover point in the figure "8" pattern described by the satellite's motion. That is, for small ellipticities, the times of equator crossing and figure "8" crossover occur concurrently.

The sin-cosine signals from the potentiometers 16, 19 and 22 are delivered to the unity gain isolation amplifiers 31 through 36 which in response thereto develop positive and negative balanced output signals. For example, in response to the cosine $\omega t$ input to amplifier 31, the latter provides a pair of output signals, namely $(+1) \cos \omega t$ and $(-1) \cos \omega t$. These balanced output signals of amplifiers 31–36 are delivered to opposite ends or terminals of the respective potentiometers 41 through 46 of the Fourier synthesizer 30. The Fourier coefficients ($a_n, b_n, c_n, d_n$) derived from the satellite's motion can each be either a positive or negative value and hence it is necessary that the potentiometers 41–46 can be capable of providing either positive or negative values at the output thereof. The development and application of positive and negative balanced signals to the opposite ends of the potentiometers provide this capability.

The synthesizer 30 in effect serves to multiply each sine and cosine signal from the sin-cosine potentiometers 16, 19 and 22 with the appropriate Fourier coefficient ($a_n, b_n, c_n, d_n$) and then it sums the same so as to arrive at correction voltages substantially porportional to the elevation, and azimuth, deviations of the satellite's motion from its average position. That is, the synthesizer derives elevation and azimuth correction voltages proportional to $$V_{E(t)} = \sum_{n=1}^{3} (a_n \cos (n\omega t) + b_n \sin (n\omega t))$$

$$V_{A(t)} = \sum_{n=1}^{3} (c_n \cos (n\omega t) + d_n \sin (n\omega t)) \tag{6}$$

where $n = 1, 2, 3$.

To this end, the acquisition and tracking radar 47 serves to track the satellite for a brief period so as to initially derive the orbit parameters of the satellite's motion in elevation and azimuth. The radar 47 is typically one of those utilized in conjunction with the launching of a space vehicle. The radar is used herein for only a brief period and hence it can be utilized on a time shared basis by a number of communications tracking stations of the type disclosed, or alternatively, it can be used for other and different purposes connected with other space vehicle projects.

The tracking information provided by radar 47 is applied to the input of a digital computer 48 which calculates the Fourier coefficients of equations (4) by iteration, and it provides a read-out of the time at which the satellite crosses the equator going north. This latter information is used to engage clutch 13 at the appropriate instant, as hereinbefore described. The digital computer also derives the average values $a_o$ and $c_o$ of equations (4) and it provides appropriate inputs to a drift compensation means, as will be described hereinafter. Each of the above tasks are readily programmed and of a relatively straight-forward nature well within the skill of the ordinary programmer. Accordingly, a detailed discussion herein of the computer program steps does not appear warranted. In an embodiment of the invention constructed in accordance with the present disclosure, a time shared general purpose digital computer (i.e., General Electric Model 635) was used in carrying out the above-recited computations.

It is commonplace for a digital computer to use the output tracking data of a target tracking radar to develop ephemerides or data tables which list, for example, the relative longitude and latitude of a synchronous earth satellite with respect to one or more antenna tracking stations. For antenna pointing purposes, such tables are preferably complied in terms of relative azimuth and elevation and they often list predictive, as well as past, orbital positions. This azimuth and elevation data is typically stored in the bulk memory of the computer and a computer printed-out of the same can, of course, be had on demand. From such stored azimuth and elevation data, describing the slow oscillatory motion of a synchronous satellite over a given time period, the digital computer 48 calculates the Fourier coefficients ($a_n$, $b_n$, $c_n$, $d_n$) for the first three terms ($n = 1, 2, 3$) and it delivers the resultant digital output signals to the digital-to-analog converter 49. It is not uncommon to carry out a Fourier series analysis by means of a general purpose digital computer (see "The Art of Computer Programming", Volume 2 — *Seminumerical Algorithms*, by D. E. Knuth, Addison-Wesley Publishing Co. (1969)) and there is nothing unusual or unique involved in the present computer calculations.

The computed Fourier coefficients for the first three terms or harmonics of the satellite's motion are delivered to a conventional digital-to-analog converter 49. The converter serves to convert the computed digital input signals to their analog equivalents and these analog voltages ($a_1$, $b_1$, $a_2$ ... $b_3$) for elevation, as well as azimuth, are delivered to the synchro system 50. The synchro system 50 comprises one or more standard synchro motors which in response to the input analog voltages from the converter 49 serves to set the wiper arms of the elevation potentiometers 41–46 and the azimuth potentiometer wiper arms (unnumbered) to appropriate positions which are analogs of the applied input analog voltages. Each wiper arm is set to a given position and it typically remains in this position for an extended, indefinite period of time. Hence, the appropriate analog voltages can be serially delivered to a single synchro motor and the wiper arm settings carried out in a sequential fashion. Or, alternatively, a plurality of synchros can be utilized, equal in number to the number of wiper arms, and the wiper arms then set simultaneously.

It will be apparent to those in the art that the above-recited computations could also be readily carried out by means of a special purpose analogue computer and the analog Fourier coefficient voltages then coupled directly to the servo system 50, thus eliminating the need for converter 49. And in a still further variant of the invention, the Fourier coefficient data can be provided in the form of a conventional digital computer read-out of alpha-numeric characters. An attendant can then simply set dials associated with the potentiometer wiper arms in accordance with the computer read-out. In this fashion, the converter 49 and synchro system 50 can be eliminated with a concomitant saving in apparatus costs. This manual setting of the potentiometer wiper arms constitutes no significant drawback since the wiper arms are typically set to given positions and then remain so set for extended intervals.

The output signals from the elevation potentiometer wiper arms are coupled, via the unity gain isolation amplifiers 51–56 and respective resistances, to the summing point 60. Accordingly, the elevation correction potential at this summing point is $V_{E(t)}$, as defined supra. That is, the harmonically related, Fourier series component voltages summed at point 60 together constitute the truncated Fourier series voltage $V_{E(t)}$ defined in Equation (6). As should be apparent to those in the art, this composite signal typically comprises a slow periodically varying signal of relatively simple waveform. The latter correction signal is then coupled, via the unity gain isolation amplifier 61, to the potentiometer-servo apparatus 62 where the correction signal is converted to shaft angle, which is used to correct the original or normal positioning of the communications antenna so that the same follows the elevation changes experienced by the satellite.

The elevation correction voltage $V_{E(t)}$ is coupled, via the isolation amplifier 61, to the differential amplifier 63 of the potentiometer-servo apparatus 62. The other input to the amplifier 63 is taken from the wiper arm of the potentiomter 64. The potential applied across the latter potentiometer is equal to that applied to the sin-cosine potentiometers 16, 19 and 22. A servo 65 is connected in the electro-mechanical feedback path extending from the output of the differential amplifier to the wiper arm of potentiometer 64. A differential output signal from the amplifier 63 causes an equivalent analog rotation of the servo shaft 66 which is transmitted to the wiper arm of potentiometer 64 causing a movement of the same in a direction such as to reduce the differential output signal. This process continues, fairly rapidly, until the potential derived from the wiper arm equals the elevation correction potential applied to the amplifier 63. Accordingly, variations in the elevation correction voltage $V_{E(t)}$ causes correspondent angular analog rotations of shaft 66, and of shaft 67. By way of example, but with no intent to limit the invention thereto, it will be clear to those in the art that the synchro system 50 may comprise a plurality of potentiometer-servo apparatus similar to that indicated by reference numeral 62, this plurality being equal in number to the number of wiper arms associated with potentiometers 41–46 and 71–76. Each input analog voltage from the digital-to-analog converter 49 (i.e., $a_1$, $b_1$, $a_2$ . . . $b_3$, for elevation) would be coupled to a respective differential amplifier (such as amplifier 63) and a wiper arm would be connected to a respective servomotor (such as servo 65). The mechanical coupling from the synchro system 50 to each of the plurality of potentiometer wiper arms is symbolically indicated in FIG. 1 by dotted line 90.

The movement of shaft 67 is coupled to the elevation drive apparatus 68 where it is utilized in an additive fasion to correct the original positioning of the communications antenna 70 so that the same follows the elevation variations of the satellite. This additive coupling can be carried out in a number of ways; for example, shaft 67 can be simply geared to the rotor of a synchro motor (not shown) of the elevation drive apparatus. As will be apparent to those in the art, there are numerous other known ways in which the voltage $V_{E(t)}$ can be used to modify the elevation pointing of antenna 70 and the present invention is in no way limited to the specific apparatus disclosed herein for accomplishing this result.

The azimuth related potentiometers 71 through 76 are connected in parallel with the potentiometers 41–46, respectively, and the computed Fourier coefficients ($c_n$, $d_n$) for the first three terms of harmonics of satellite's motion in azimuth are utilized, in the same manner as previously described, to set the wiper arms of the azimuth potentiometers 71–76 to appropriate positions. The output signals from the azimuth potentiometer wiper arms are then summed and this summed voltage $V_{A(t)}$, defined supra, is used to correct the original or central positioning of the communications antenna so that the same follows the azimuth changes experienced by the satellite. These operations, related to antenna azimuth correction, are carried out in exactly the same manner as previously described elevation correction and therefore further duplication in the circuit schematic and further detailed discussion herein does not appear necessary, or warranted, to convey a complete understanding of the present invention.

The computed average values of $a_o$ and $c_o$, defined in equations (4), are converted in converter 49 to their analog voltage equivalents and the latter are respectively delivered to the elevation drive 68 and to the azimuth drive 69. The communications antenna 70 is thus initially positioned to the average position of the satellite. The satellite's elevation and azimuth variations from the average are accounted for by the Fourier series synthesis heretofore described. Perhaps it should be noted, here again, that the average values of $a_o$ and $c_o$ can also be provided in the form of a conventional digital computer read-out of alpha-numeric characters. An attendant can then manually adjust the pointing of antenna 70 in accordance with the computer read-out of $a_o$ and $c_o$. An initial manual setting or positioning of the antenna is not particularly onerous since the task is usually performed only once.

Because of the non-sphericity of the earth, and other known factors, a synchronous earth satellite typically tends to drift slowly from its initial position or station to one over a more westerly point on earth. To track this slow westerly drift the pointing of antenna 70 must be modified, in both elevation and azimuth, in a slow continuous fashion. From the orbit parameters of the satellite's motion provided by radar 47, the computer 48 derives an initial approximation of this drift factor in terms of elevation and azimuth drift compensation signals. The latter signals, being digital in nature, are converted in converter 49 to analog voltage equivalents and thence delivered to the input of the drift compensator apparatus 80. The compensator 80 serves to produce an elevation, drift compensation, voltage $V_{E(d)}$ and an azimuth, drift compensation, voltage $V_{A(d)}$ in response to these input analog voltages. This slowly varying voltage $V_{E(d)}$ is delivered, via resistance 81 and isolation amplifier 82, to the summing point 60 so as to cause a corresponding slow alteration in the elevation pointing of antenna 70, in the manner hereinbefore described. Similarly, the slowly varying voltage $V_{A(d)}$ causes a slow alteration in the azimuth pointing of the antenna 70. Accordingly, the antenna 70 is caused to track the slow westerly drift of the satellite.

The development of the slowly varying voltages $V_{E(d)}$ and $V_{A(d)}$ is carried out in drift compensator 80, in identical fashion. For example, the input analog elevation compensation signal is delivered to a variable speed motor (not shown) whose rate of rotation is a function of the amplitude of the applied analog voltage. A reduction gear train then translates this motor rotation to a very much lower output rotation of a potentiometer wiper arm. The voltage $V_{E(d)}$ is derived from this wiper arm and therefore the slow movement of said wiper arm serves to generate a slowly changing (i.e., increasing) voltage $V_{E(d)}$.

After an extended period of time (e.g., 4–6 weeks) the acquisition and tracking radar 47 is utilized to check the location and orbit parameters of the satellite and hence a much more accurate determination of the rate of drift can then be arrived at. The drift compensator apparatus 80 is reset and new values for $V_{E(d)}$ and $V_{A(d)}$ are generated, as described, in accordance with the newly determined rate of satellite drift.

Here once again, the computed values for elevation and azimuth drift compensation can be provided in the form of a conventional digital computer read-out and an attendant can then manually control the rotation rate of the variable speed motors (not shown) of drift compensator 80. Since this manual task is required only at infrequent intervals it is not particularly onerous.

For orbits of inclination and/or ellipticity greater than those previously noted (i.e., for inclinations > 12° and ellipticity > 0.01), a discrete or partial Fourier series synthesis of additional terms of the Fourier series representation of the satellite's motion can be provided. That is, in equations (6), $n$ can be any discrete finite value ($n = 1, 2, 3, \ldots 6$, or more). These addition terms can be synthesized in exactly the same manner as previously described. Thus, while it is convenient to limit the present disclosure to the synthesis of the first three terms of the Fourier series representation, it should be clear that the invention is in no way limited thereto and additional terms can also be synthesized at the option of the circuit designer.

For good signal-to-noise ratio, the antenna 70 should preferably be of a substantial size, e.g., a 20 foot horn-reflector, which was utilized in the embodiment constructed in accordance with the invention, a 20+ foot parabolic reflector, or any other known, large scale, microwave antenna. Such large size antennae typically possess a concomitantly narrow or small angle beam which necessitates accurate tracking capabilities for the use here intended. The synchronous satellite can be either active or passive. An active satellite normally includes spin-stablization and attitude control apparatus; see, for example, U.S. Pat. No. 3,516,623 to F. W. Sinden, issued June 23, 1970. Active synchronous satellites appear to be preferred at this time and these typically include a receiving antenna array and one or more transmitting antennae for two-way communication between two or more widely separated stations or points on earth. With two or more transmitting antennae each of the same is directed or pointed to the approximate location of a given earth station. However, for weight and economic considerations, a single transmitting antenna generally appears preferable. This single antenna can be non-directional so as to cover a large area of the apparent earth's surface. Or, alternatively, by using phase-feeding techniques known in the art, its directivity can be altered in accordance with the direction of the intended earth station.

It should thus be clear at this point that the invention is in no way limited to any particular form of synchronous satellite or any particular apparatus configuration thereof. Furthermore, while the principles of the present invention have been carried out herein by means of electro-mechanical apparatus, it will be evident to those in the art that the desired functions can be performed entirely by electronic circuitry. And while an azimuth-elevation coordinate arrangement has been described herein and is probably the most expedient, the invention is not necessarily limited thereto and other known coordinate systems (e.g., a polar coordinate arrangement) can be advantageously utilized in practicing the invention. Accordingly, it is to be understood that the foregoing disclosure relates to only a preferred embodiment of the invention and numeraous changes, modifications or alterations may be made without departing from the spirit and scope of the invention.

What is claimed is:

1. In a communications system which includes a synchronous earth satellite whose orbit is inclined and/or elliptical so that the satellite's motion takes the form of a figure "8" pattern and an antenna for tracking the same, means for deriving the orbit parameters of the satellite's motion in azimuth and elevation, means for employing the derived azimuth and elevation orbit parameters to produce voltages that are indicative of partial Fourier series representations of the elevation and azimuth motions of the satellite, and means operative in response to said produced voltages to alter the pointing of the tracking antenna so that the same substantially follows the figure 8 pattern described by the satellite.

2. A communications system as defined in claim 1 wherein the partial Fourier series representations are comprised of a limited number of discrete terms.

3. A communications system as defined in claim 2 wherein said limited number of terms is equal to three.

4. A communications system as defined in claim 3 including means for initially positioning the tracking antenna to the average position of the satellite.

5. A communications system as defined in claim 4 including means for compensating for any slow westerly drift experienced by the satellite.

6. A communications system comprising a synchronous earth satellite having an orbit which is inclined and/or elliptical so that the satellite's motion takes the form of a figure "8" pattern, an antenna for tracking the satellite, means for deriving the orbit parameters of the satellite's motion in azimuth and elevation, means operative in response to the derived orbit parameters for positioning the tracking antenna to the average position of the satellite, synthesizer means utilized the derived orbit parameters to produce elevation and azimuth correction voltages respectively proportional to $$V_{E(t)} = \sum_{n=1}^{m} (a_n \cos (n\omega t) + b_n \sin (n\omega t)),$$

$$V_{A(t)} = \sum_{n=1}^{m} (c_n \cos (n\omega t) + d_n \sin (n\omega t))$$

where $\omega = 2\pi/24$, $t =$ in sidereal hours, $n = 1, 2, 3, \ldots, m =$ predetermined discrete number, and $a_n, b_n, c_n, d_n$ are Fourier coefficients derived from said orbit parameters, and means operative in response to said elevation and azimuth correction voltages to alter the pointing of the tracking antenna so that the same substantially follows the figure 8 pattern described by the satellite.

7. A communications system sa defined in claim 6 wherein $m = 3$.

8. A communications system as defined in claim 7 including means for compensating for slow westerly drift experienced by the satellite.

9. In a communications system which includes a synchronous earth satellite whose orbit is inclined and/or elliptical so that the satellite's motion takes the form of a figure "8" pattern, an antenna for tracking the satellite and a computer for deriving the orbit parameters of the satellite's motion in azimuth and elevation, which system is characterized by means operative in response to the derived azimuth and elevation orbit parameters for producing voltages that are indicative of partial Fourier series representations of the azimuth and elevation motions of the satellite, and means operative in response to the partial Fourier series representational voltages to alter the pointing of the tracking antenna so that the same substantially follows the figure 8 pattern described by the satellite.

* * * * *